US012623375B2

(12) United States Patent
Gneuss et al.

(10) Patent No.: US 12,623,375 B2
(45) Date of Patent: May 12, 2026

(54) MULTI-SHAFT PREPARATION UNIT FOR PLASTIC MELTS

(71) Applicant: Gneuss GmbH, Bad Oeynhausen (DE)

(72) Inventors: Stephan Gneuss, Bad Oeynhausen (DE); Daniel Gneuss, Charlotte, NC (US); Detlef Gneuss, Carabietta (CH)

(73) Assignee: Gneuss GmbH, Bad Oeynhausen (DE)

( * ) Notice: Subject to any disclaimer, the term of this patent is extended or adjusted under 35 U.S.C. 154(b) by 470 days.

(21) Appl. No.: 18/196,943

(22) Filed: May 12, 2023

(65) Prior Publication Data

US 2023/0278261 A1 Sep. 7, 2023

Related U.S. Application Data

(63) Continuation of application No. PCT/DE2021/100906, filed on Nov. 12, 2021.

(30) Foreign Application Priority Data

Nov. 13, 2020 (DE) ..................... 10 2020 130 080.8

(51) Int. Cl.
    *B29B 7/48* (2006.01)
(52) U.S. Cl.
    CPC .............. *B29B 7/488* (2013.01); *B29B 7/485* (2013.01); *B29B 7/486* (2013.01)
(58) Field of Classification Search
    CPC ................................. B29B 7/485; B29B 7/488

(Continued)

(56) References Cited

U.S. PATENT DOCUMENTS 1,356,296 A * 10/1920 La Casse ................ B29B 7/485
                                                      366/85
3,310,837 A * 3/1967 Wittrock ................ B29C 45/50
                                                      366/85

(Continued)

FOREIGN PATENT DOCUMENTS

CN       103935013 A      7/2014
DE        2149842 B2     10/1972

(Continued)

OTHER PUBLICATIONS

International Search Report dated Mar. 14, 2022 in corresponding application PCT/DE2021/100906.

*Primary Examiner* — David L Sorkin
(74) *Attorney, Agent, or Firm* — Muncy, Geissler, Olds & Lowe, P.C.

(57) ABSTRACT

A multi-shaft preparation unit for plastic melts, having an extruder housing with an enclosed treatment chamber in its interior, and at least one rotor body shaft mounted rotatably in the treatment chamber and a sealing and guiding body with multiple recesses, in each of which a satellite screw is mounted. The multi-shaft preparation unit has a drive unit in which a gearing unit is arranged outside the extruder housing between a drive motor and the treatment chamber and is connected to the drive shaft sections of the rotor body shaft and of the satellite screws which lead out of the treatment chamber of the extruder housing. A separating device for decoupling a flow of fluid and/or heat emanating from the treatment chamber is provided between the extruder housing and the gearing unit, through which the drive shaft ends of the rotor body shaft and of the satellite screws pass.

9 Claims, 6 Drawing Sheets

(58) Field of Classification Search
USPC .................................................... 366/83–85
See application file for complete search history.

(56) References Cited

U.S. PATENT DOCUMENTS

| | | | | |
|---|---|---|---|---|
| 3,355,766 | A | | 12/1967 | Causemann |
| 3,640,669 | A | * | 2/1972 | Hanslik ................. B29C 48/435 |
| | | | | 425/204 |
| 3,746,319 | A | | 7/1973 | Blach |
| 4,176,967 | A | * | 12/1979 | Brinkmann ............. B29B 7/485 |
| | | | | 425/207 |
| 4,423,960 | A | | 1/1984 | Anders |
| 5,106,198 | A | * | 4/1992 | Muller .................... B29C 48/44 |
| | | | | 366/75 |
| 5,476,319 | A | * | 12/1995 | Blach ..................... B01F 27/75 |
| | | | | 366/139 |
| 5,490,725 | A | | 2/1996 | Behrens et al. |
| 5,836,682 | A | * | 11/1998 | Blach ..................... B29C 48/43 |
| | | | | 425/204 |
| 6,705,753 | B2 | | 3/2004 | Behling |
| 7,513,677 | B2 | | 4/2009 | Gneuss et al. |
| 9,061,442 | B2 | | 6/2015 | Gneuss et al. |

| | | | | |
|---|---|---|---|---|
| 2005/0047267 | A1 | * | 3/2005 | Gneuss ..................... B29B 7/86 |
| | | | | 366/83 |
| 2010/0067320 | A1 | | 3/2010 | Blach et al. |
| 2015/0069652 | A1 | * | 3/2015 | Clark .................. B29B 17/0412 |
| | | | | 264/143 |
| 2015/0076744 | A1 | | 3/2015 | Clark |
| 2017/0275785 | A1 | * | 9/2017 | Williams ................ B29B 7/426 |
| 2018/0250864 | A1 | * | 9/2018 | Clark ...................... B29C 48/05 |
| 2020/0282369 | A1 | * | 9/2020 | Gneuss ................. B01F 27/726 |
| 2021/0283814 | A1 | | 9/2021 | Gneuss et al. |
| 2021/0283817 | A1 | | 9/2021 | Gneuss et al. |

FOREIGN PATENT DOCUMENTS

| | | | |
|---|---|---|---|
| DE | 102006052610 | A1 | 5/2008 |
| DE | 102018130102 | A1 | 5/2020 |
| GB | 1133727 | A | 11/1968 |
| GB | 2282344 | A | 4/1995 |
| JP | H07328823 | A | 12/1995 |
| JP | H10138235 | A | 5/1998 |
| JP | 2001150509 | A | 6/2001 |
| JP | 2003523849 | A | 8/2003 |
| JP | 2014168957 | A | 9/2014 |
| WO | WO03033240 | A1 | 4/2003 |
| WO | WO2020099684 | A1 | 5/2020 |

\* cited by examiner 31    31.5  23.1  31.5  23.2  31.8  22.2  33

22.1

31.8  31.2  31.4  31.1  31.6  31.7  33.1

MULTI-SHAFT PREPARATION UNIT FOR PLASTIC MELTS

This nonprovisional application is a continuation of International Application No PCT/DE2021/100906, which was filed on Nov. 12, 2021, and which claims priority to German Patent Application No 10 2020 130 080.8, which was filed in Germany on Nov. 13, 2020, and which are both herein incorporated by reference.

BACKGROUND OF THE INVENTION

Field of the Invention

The invention relates to a multi-shaft preparation unit for plastic melts.

Description of the Background Art

For the treatment of plastic melts, in particular polyester, a multi-shaft preparation unit in the form of a so-called Multi Rotation System (MRS), which is fundamentally described in WO 2003 033 240 A1 (which corresponds to US 2005/0047267, which is incorporated herein by reference), has proven to be successful. It contains an extruder screw, which comprises a so-called polyrotation unit with a rotor body shaft between a feed and metering zone for drawing in and melting the plastic, and a discharge zone. The latter has a significantly larger diameter as compared to the other zones and also several rotating satellite screws. With the multi rotation system, a significant increase in degassing performance is achieved as compared to single and twin screw systems. Consequently, the residence time of the melt in the polyrotation unit can be kept very short. The degree of filling, i.e., the proportion of the volume taken up in the operation of plastic melts in relation to the total free volume in the treatment chamber in which the rotor body shaft rotates with the satellite screws, is specified by design by the coordination of diameters and pitches of the screws and is optimized for a specific application. A change of the filling degree as well as the residence time is possible during operation at best to a limited extent.

In addition, the well-known drive concept provides for a drive zone for the satellite screws, which is located within the treatment chamber intended for degassing. The melt transferred from the metering zone is passed through the drive zone. On the one hand, the energy input taking place via the shearing occurring there can be advantageous because it favors the homogenization of the plastic melts. On the other hand, a high drive power is required to drive the extruder screw, which is already very long with several zones in a row, from its end together with the satellite screws. The treatment of highly viscous plastic melts in such a multi rotation system therefore has limits.

A multi-shaft preparation unit described in CN 101 293 397 A does not have an external gearing. All gears are located directly in the medium that is conveyed and treated in the preparation unit. This means that no thermal decoupling is possible. In addition, the shearing to which the plastic is exposed in the drive zone with the gears has a negative effect on plastic melts. Furthermore, the treatment chamber opens so far in the direction of the drive that the rotating sealing ring is exposed to the hot plastic melts.

A multi-shaft extruder according to DE 10 2006 052 610 A1, which corresponds to US 2010/0067320, has satellite screws which are fixed but are not part of a rotating unit. The preparation unit and the gearing unit are separated from each other. However, this does not have a cooling purpose. Cooling should take place solely via cooling channels.

SUMMARY OF THE INVENTION

It is therefore an object of the present invention to provide a multi-shaft preparation unit for plastic melts of the type mentioned above so that in particular also highly viscous plastic melts are easy to process.

The solution according to the present invention includes a multi-shaft preparation. According to an exemplary embodiment of the invention, the melt is fed from an outsourced melting extruder into the treatment chamber, so that the rotor body shaft as the main rotor shaft, which carries the rotor body in which the satellite screws are mounted, has no feed and metering zone.

The invention provides an external drive for the multi-shaft preparation unit, in which drive both the central rotor body shaft and each individual satellite screw have an extended rear shaft end, which is led out of the treatment chamber. Between an extruder housing enclosing the treatment chamber and a gearing unit arranged outside of it, a separating device is provided with or in which possible negative influences on the gearing can be reduced or even compensated:

Material flows in the form of leakage flows escaping from the extruder housing are interrupted in the separating device, so that contamination of the gearing with plastic melts is excluded even in the event of a malfunction in which pressure builds up in the treatment chamber.

Alignment errors between the bearing of the respective front shaft ends in the extruder housing and in the gearing can be compensated by couplings arranged in the separating device. This also applies in the event that the satellite screws do not have a front bearing in the extruder housing or on the extruder screw shaft but rotate freely in the recesses on the rotor body shaft.

Heat flows flowing from the treatment chamber by means of heat conduction over the sections of the rotor body shaft and the satellite screws leading into the gearing can be reduced, in particular if a fluid flows through the separating device. By selecting suitable couplings for the shaft sections passing through the separating device, the heat flow can also be inhibited or interrupted. These measures allow for the gearing temperature to be kept below 100° C.

The rotor body shaft has a sealing and guide section on its side facing the separating device. Between this and the extruder bore in the housing, an annular gap is formed, which is dimensioned in terms of its radial gap width and its expansion in the axial direction such that some plastic melts can penetrate there to ensure lubrication. The rear end of the rotor body shaft is mounted in the extruder housing via the sealing and guide section.

In the annular gap, at least one sealant can be provided to prevent plastic melts from running into the separating device. The sealant may be formed by a return thread and/or a temperature-resistant shaft seal. The sealing and guide section also forms the bearing for the satellite screw shafts passing through it. Between the respective bearing bores and the satellite screw shafts, at least one sealant is also provided in each case to prevent melt from running along the satellite screw shafts into the separating device.

The rotor body shaft can be equipped with five to eight satellite screws in order to obtain, depending on the size, an alternating sequence of recesses, in each of which a satellite screw is accommodated, and sections of the rotor shell, which are provided with a main screw flight.

At the separating device and/or an adjacent end section of the multi shaft preparation unit, a temperature control channel flowed through by a coolant may be provided to cool the separating device along with its cavity and thus reduce the heat flow conducted by heat conduction over the respective shaft sections into the gearing unit.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
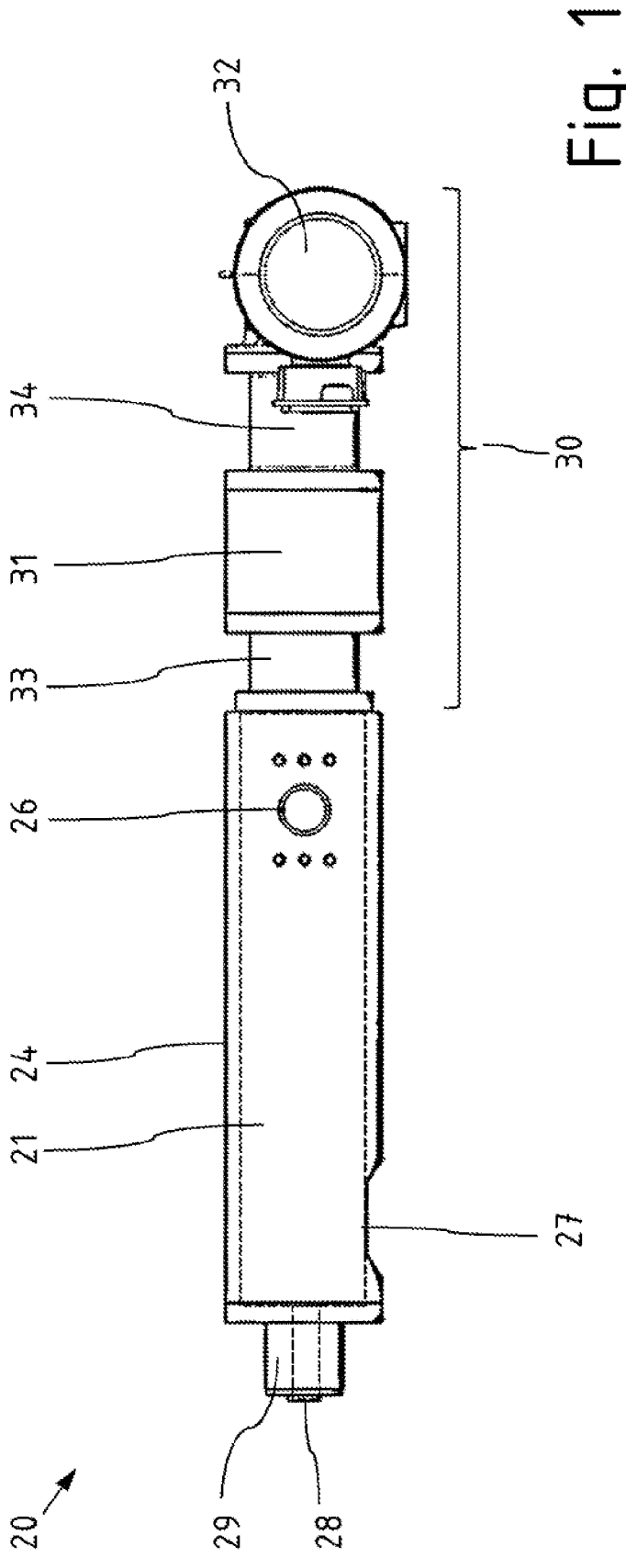
FIG. 1 is a multi-shaft preparation unit in a lateral view.

A multi shaft preparation unit 20 is shown in FIG. 1 in a lateral view. This has an extruder housing 24 with an enclosed treatment chamber 21 for the plastic melts. The plastic melts supplied from an external melting extruder is introduced at a peripheral entry opening 26 in the housing jacket of the extruder housing 24 and discharged at a discharge opening 27, also arranged peripherally. The discharge opening 27 is preferably arranged on the underside of the treatment chamber 21 to facilitate the discharge by gravity in a pressure-less mode of operation.

On an end-side flange 29 of the extruder housing 24, a connection to a temperature control channel 28 is provided, which extends into the interior of a rotor body shaft having a plurality of satellite screws that rotates in the treatment chamber 21.

The external view in FIG. 1 already shows that the drive unit 30 is arranged externally, i.e., outside the extruder housing 24 and in particular completely outside a flow path formed between the entry opening 26 and the discharge opening 27 for the plastic melts. A motor 32 acts via a coupling unit 34 and a gearing unit 31 on the rotor body shaft in the treatment chamber 21. Between the gearing unit 31 and the rotor body shaft, a separating device 33 is provided. This causes a decoupling of a fluid and/or heat flow emanating from the treatment chamber 21. The separating device 33 insulates and seals off against the treatment chamber 21 and at the same time leads out the shaft ends of all shafts of the multi shaft preparation unit 20 in the direction of the gearing 31.

Figure 2:
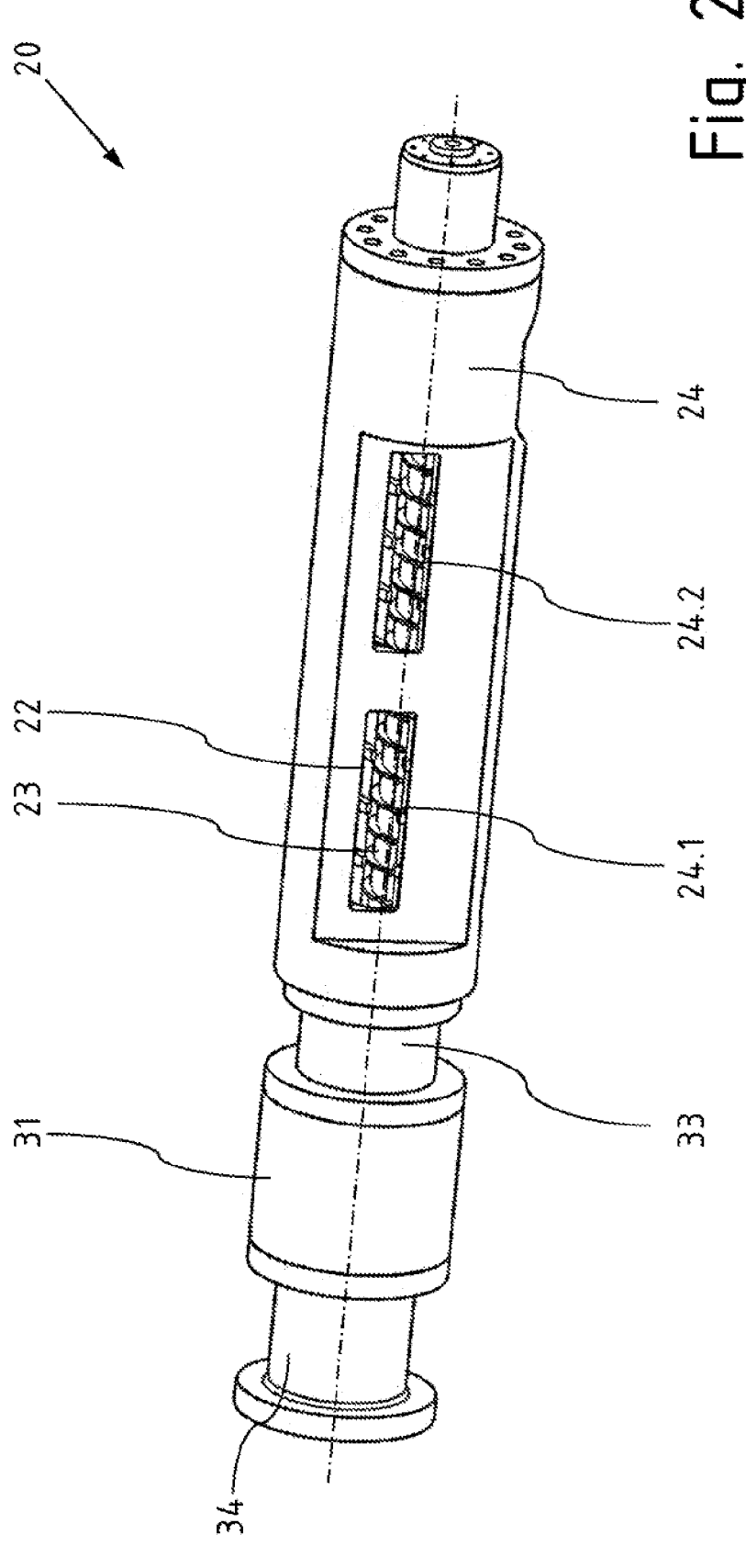
FIG. 2 is the multi-shaft preparation unit in a perspective view from the rear.

FIG. 2, which is a perspective view on a back of the multi-shaft preparation unit 20, shows the rotor body shaft 22 equipped with a plurality of satellite screws 23, which rotates past suction openings 24.1, 24.2 in the extruder housing 24. A suction line of a vacuum pump is connected to the suction openings 24.1, 24.2. For effective degassing of the treatment chamber, the suction housing openings 24.1, 24.2 extend together over at least 75% of the axial length of the treatment chamber 21.

Figure 3:
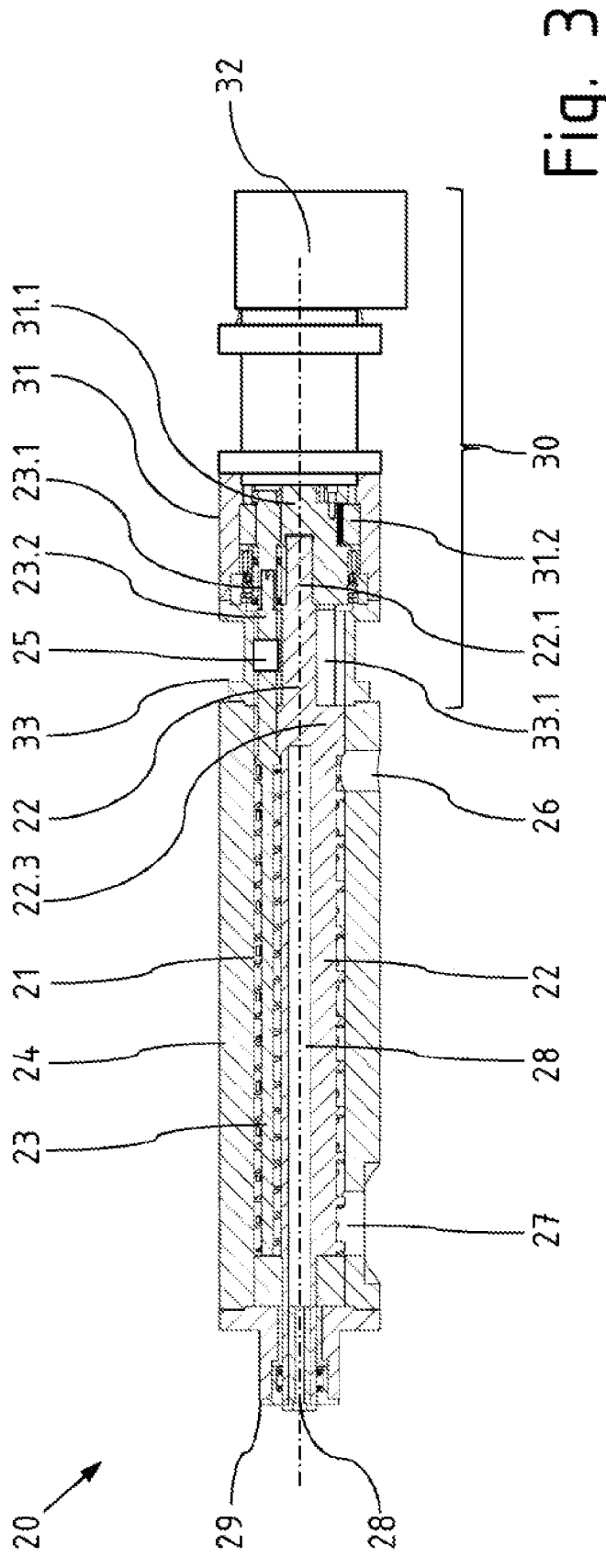
FIG. 3 is the multi-shaft preparation unit in a lateral sectional view.

FIG. 3 illustrates the multi-shaft preparation unit 20 with drive unit 30 in a lateral sectional view. For better understanding, the entry opening 26, which in reality is peripherally arranged, has been rotated into the section plane.

In the treatment chamber 21 of the extruder housing 24, the rotor body shaft 22 with the satellite screws 23 is mounted rotatably. A front bearing point of the rotor body shaft 22 as viewed in the direction of flow is formed in the region of the flange 29. Through the temperature control channel 28 that flows there, it can be preheated, e.g., when starting up at the start of production, but can also be cooled. A rear bearing point of the rotor body shaft 22 is formed by a sealing and guide section 22.3.

The required cooling capacity in the system can be greatly reduced according to the invention because the drive of the satellite screws 23 does not, as is customary in the prior art, take place in a drive zone, which is formed by a toothing lying in the treatment chamber on the rotor body shaft 22, but is completely outsourced in the region beyond the separating device 33. Due to the complete outsourcing of the drive for all shafts, energy input is prevented, which would occur in an internal drive zone due to the shearing of the melt that always occurs there.

According to the invention, each satellite screw 23 is extended rearwards with a shaft section 23.2 and runs out in a pinion 23.1 in a gearing 31. The gearing 31 essentially comprises an annular gear 31.2 with internal toothing and a gearing rotor body 31.1, which is connected torque-locked on the one hand to a drive end 22.1 of the rotor body shaft 22 and on which on the other hand a bearing point is formed for each satellite screw 23. The satellite screws 23 each engage with their pinion 23.1 in the annular gear 31.2 and are driven by it when the rotor body shaft 22 is driven and rotates.

The separating device 33 comprises a cavity 33.1 through which the shaft ends of the rotor body shaft 22 and the satellite screws 23 pass. The shaft ends 23.2 of the satellite screws 23 are divided in the illustrated embodiment within the separating device 33, wherein the two shaft sections are each coupled with a coupling element 25, which is arranged within the cavity 33.1. As a result, any misalignment between the respective part of the satellite screw 23 located in the extruder housing 24 and its ends, which are mounted in the gearing rotor body 31.1, can be compensated. At the same time, the heat conduction into the gearing 31 can be reduced.

FIG. 4 again shows the sectional view from FIG. 3, this time enlarged to show in detail the rear area of the extruder housing 24 and the gearing unit 31 extended by the separating device 33. The cutting plane here is horizontal, so that the sectional view also includes a part of the lateral suction opening 24.1.

Figure 4:
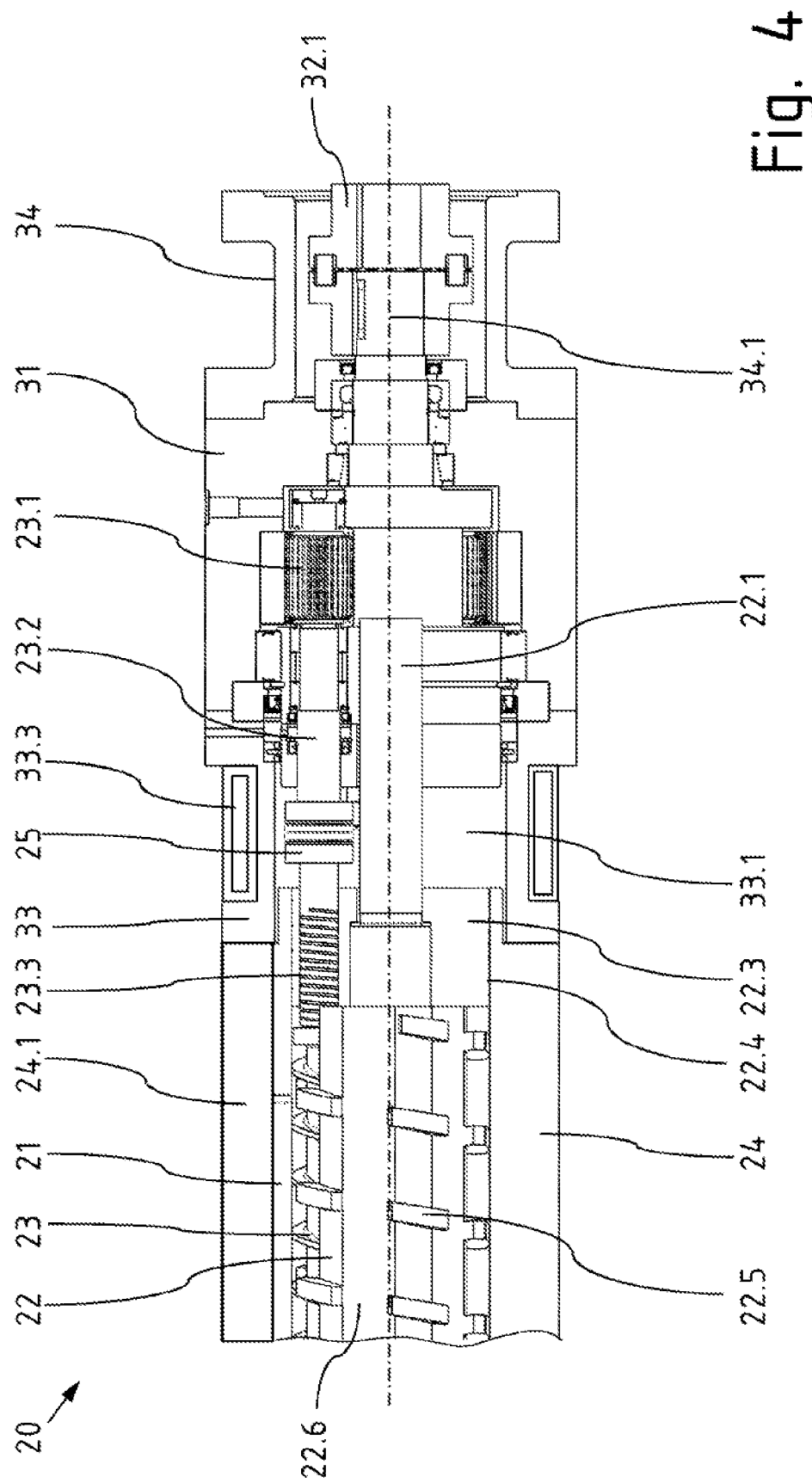
FIG. 4 is the multi-shaft preparation unit in an enlarged sectional view.

On the left in FIG. 4, a section of the rotor body shaft 22 is visible. It has a main screw flight 22.5, the outer diameter of which corresponds approximately to the inner diameter of the cylindrical cavity in the extruder housing 24, which forms the treatment chamber 21. On the rotor body shaft 22, several deep recesses are made distributed over the circumference, each of which forms a receiving groove 22.6 for a satellite screw 23. For better display, no satellite screw is drawn in the receiving groove 22.6, which in the view according to FIG. 4 points to the viewer.

Each shaft section 23.2 of a satellite screw 23 in the illustrated embodiment is first fed through the seal and guide section 22.3 of the rotor shaft 22 at the rear end of the extruder housing 24 and then through the pressure-less cavity 33.1 in the separating device 33. At the shaft sections 23 guided through the sealing and guide section 22.3. 2 of the satellite screws 23, in each case a points to the viewer is formed. Its orientation is chosen such that in the respective direction of rotation given in operation of rotor body shaft 22 and satellite screws 23 a conveyance to the treatment chamber 21, in the direction of the discharge opening, is effected, i.e., in a direction pointing away from the gearing unit 31. The sealing and guide section 22.3 also has at least one return thread 22.4 on its outer circumference, wherein the orientation is again coordinated with the direction of rotation of the rotor body shaft 22 in operation such that the conveyance takes place in the direction of the discharge opening.

Since in most operating states a low degree of filling is specified in the multi-shaft preparation unit 20 and a vacuum is applied at the suction openings, the treatment chamber 21 is usually not under internal pressure. The sealing and guide section 22.3 with the return thread 22.4 as well as the shaft sections 23.2 with return thread 22.4 therefore do not have to provide a pressure seal in normal operation, but instead serve as a safety against unforeseen operating conditions and otherwise avoid a general carry-over of plastic melts via the separating device 33 into the gearing unit 31.

On the outside of the housing of the separating device 33, a temperature control channel 33.3 flowed through by a coolant is provided.

On the other side of the gearing unit 31, a coupling unit 34 with a shaft coupling 34.1 is provided, by means of which a gearing rotor body 31.1 is connected to an output shaft 32.1 of the motor 32.

Figure 5:
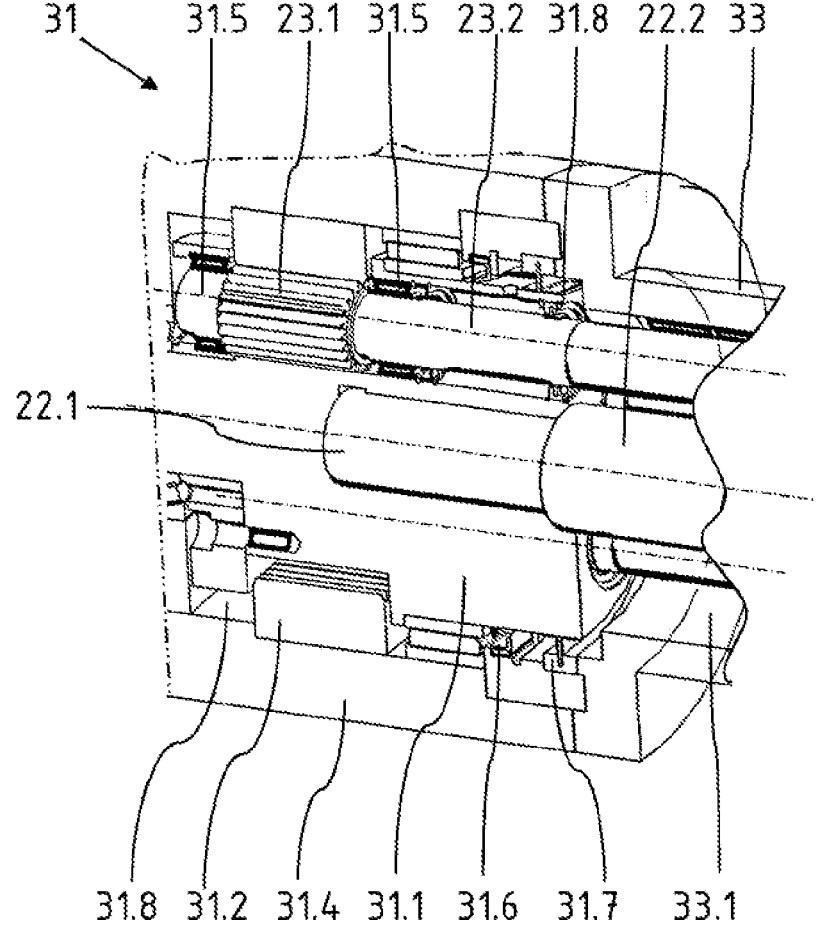
FIG. 5 is a gearing unit and separating device in a perspective view.

The gearing unit 31 is shown in perspective in FIG. 5. The shaft sections 22.2, 23.2 of the rotor body shaft and the satellite screws pass through the cavity 33.1 of the separating device 33 into the gearing rotor body 31.1. A drive shaft end 22.1 of the rotor body shaft 22 is provided with an external toothing which engages in a correspondingly toothed insertion bore in the center of the gearing rotor body 31.1.

The gearing rotor body 31.1 and the rotor body shaft 22 are thus coupled torsionally rigid. The satellite screws 23 are mounted with their shaft section 23.2 in roller bearings 31.5 in the gearing rotor body 31.1, on both sides of the annular gear 31.2 tightly fixed in a gear housing 31.4. Between the bearing points, the satellite screws 23 each have a pinion 23.1, which engages in the annular gear 31.2. With a rotation of the gearing rotor body 31.1 against the gear housing 31.4, therefore, the satellite screws 23 are driven in opposite directions to the rotor body shaft 22, wherein their speed results from the pitch circle diameters of the pinion 23.1 and annular gear 31.2 toothings and is preferably about 3 times greater than the speed of the gearing rotor body 31.1. In this embodiment, the satellite screws 23 are thus driven solely by the internal toothing of the annular gear 31.2, but do not engage in a further external toothing on the gearing rotor body 31.1. Thus, they are not driven by a sun gear; therefore, the gearing unit 31 does not represent a planetary gear.

At the outer circumference of the gearing rotor body 31.1, a plurality of sealing rings 31.6, 31.7 are provided to seal the oil-filled interior 31.8 of the gearing unit 31 against the cavity 33.1 of the separating device 33. In order to seal the through holes for the shaft sections 23.2 of the satellite screws 23 in the gearing rotor body 31.1 against the cavity 33.1 of the separating device 33, shaft seals 31.8 are provided.

Figure 6:
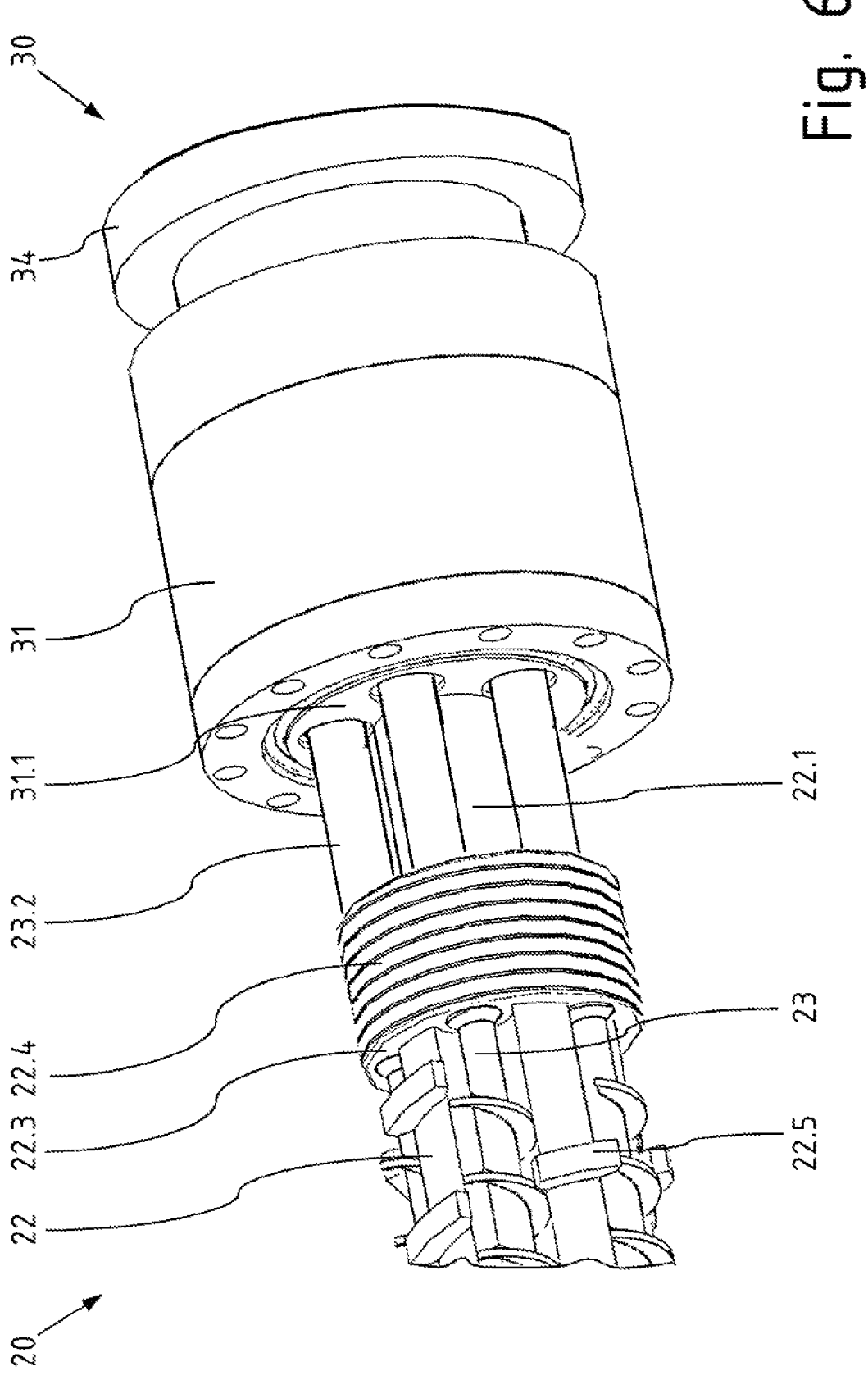
FIG. 6 is parts of the multi-shaft preparation unit and the gearing unit in a perspective view.

FIG. 6 shows a view of a rear area of the rotor body shaft 22 and the gearing unit 31 behind it. The extruder housing and the housing of the separating device are not shown. The rotor body shaft 22 has a sealing and guide section 22.3 on its side facing the gearing unit 31, which is provided with a return thread 22.4 on its outside. An annular gap is formed between the sealing and guide section 22.3 and the extruder bore in the housing, which is so long in terms of its radial gap width and its expansion in the axial direction that some plastic melts can penetrate there to ensure lubrication. The rear end of the rotor body shaft 22 is supported in the extruder housing over the sealing and guide section 22.4. The sealing and guide section 22.4 in each case forms, with several holes arranged on a partial circle, a bearing for the satellite screw shaft sections 23.2 passing through.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A multi-shaft preparation unit for plastic melts, the multi-shaft preparation unit comprising:
   an extruder housing that has an enclosed treatment chamber for plastic melts in an interior thereof, and has at least one rotor body shaft mounted rotatably in the treatment chamber with at least two receiving grooves, in each of which a satellite screw is mounted;
   a drive unit in which outside the extruder housing, between a drive motor and the treatment chamber, a gearing unit is arranged, which is connected to drive shaft sections of the rotor body shaft and the satellite screws led out of the treatment chamber of the extruder housing; and
   a separating device arranged between the extruder housing and the gearing unit, the separating device provided for decoupling a flow of fluid and/or heat emanating from the treatment chamber, through which the respective drive shaft sections of the rotor body shaft and the satellite screws pass,
   wherein the drive shaft sections of the rotor body shaft and the satellite screws pass through at least one cavity in the separating device, and
   wherein the drive shaft ends of the rotor body shaft and the satellite screws are each guided through holes in a sealing and guide body on the rotor body shaft, which sealing and guide body closes off the rear part of the treatment chamber.

2. The multi-shaft preparation unit according to claim 1, wherein at an end of the extruder housing facing the cavity and/or in a wall of the separating device, at least one temperature control channel is formed, which is flowable by a temperature control fluid.

3. The multi-shaft preparation unit according to claim 1, wherein the drive shaft sections of the satellite screws in the cavity are each divided into two sections, each of which is connected to each other via a coupling element.

4. The multi-shaft preparation unit according to claim 3, wherein the coupling elements are designed as a metal bellows coupling.

5. The multi-shaft preparation unit according to claim 1, wherein the drive shaft sections of the satellite screws are provided with a return thread at least over a portion of their length section located in the respective holes of the sealing and guide body.

6. The multi-shaft preparation unit according to claim 1, wherein sealing and guide bodies on the rotor body shaft are provided with a return thread at least over a portion of their length.

7. The multi-shaft preparation unit according to claim 1, wherein the rotor body shaft is connected to a gearing rotor body of the gearing unit and the drive shaft sections of the satellite screws are mounted rotatably in the gearing rotor body, and wherein the satellite screws, in each case provided with a pinion on their end side, engage solely in a fixed internal annular gear which surrounds the gearing rotor body.

8. The multi-shaft preparation unit according to claim 1, wherein on the extruder housing, a downward-pointing discharge housing opening is provided.

9. The multi-shaft preparation unit according to claim 1, wherein on the housing of the multi-shaft preparation unit, at least one suction housing opening is provided, to which a vacuum pump is connected, and wherein the one suction housing opening or multiple suction housing openings together extend over at least 75% of the axial length of the treatment chamber.

\* \* \* \* \*